United States Patent [19]

Eastman et al.

[11] 4,272,193
[45] Jun. 9, 1981

[54] METHOD AND APPARATUS FOR TIMING OF LASER BEAMS IN A MULTIPLE LASER BEAM FUSION SYSTEM

[75] Inventors: Jay M. Eastman, Pittsford; Theodore L. Miller, Rochester, both of N.Y.

[73] Assignee: The United States of America as represented by the United States Department of Energy, Washington, D.C.

[21] Appl. No.: 30,044

[22] Filed: Apr. 13, 1979

[51] Int. Cl.$^3$ .............................................. G01B 9/02
[52] U.S. Cl. .................................... 356/349; 356/358
[58] Field of Search ....................... 356/349, 358, 359

[56] References Cited

U.S. PATENT DOCUMENTS

| | | | |
|---|---|---|---|
| 3,175,088 | 3/1965 | Herriott | 250/199 |
| 3,950,100 | 4/1976 | Keene et al. | 356/28.5 |
| 4,030,831 | 6/1977 | Gowrinathan | 356/349 |

OTHER PUBLICATIONS

Morgan, *Introduction to Geometrical and Physical Optics*, McGraw-Hill, pp. 223-227, 1953.

*Primary Examiner*—John K. Corbin
*Assistant Examiner*—Matthew W. Koren
*Attorney, Agent, or Firm*—Leonard Belkin; Dean E. Carlson; James E. Denny

[57] ABSTRACT

The optical path lengths of a plurality of comparison laser beams directed to impinge upon a common target from different directions are compared to that of a master laser beam by using an optical heterodyne interferometric detection technique. The technique consists of frequency shifting the master laser beam and combining the master beam with a first one of the comparison laser beams to produce a time-varying heterodyne interference pattern which is detected by a photo-detector to produce an AC electrical signal indicative of the difference in the optical path lengths of the two beams which were combined. The optical path length of this first comparison laser beam is adjusted to compensate for the detected difference in the optical path lengths of the two beams. The optical path lengths of all of the comparison laser beams are made equal to the optical path length of the master laser beam by repeating the optical path length adjustment process for each of the comparison laser beams. In this manner, the comparison laser beams are synchronized or timed to arrive at the target within $\pm 1 \times 10^{-12}$ second of each other.

10 Claims, 5 Drawing Figures

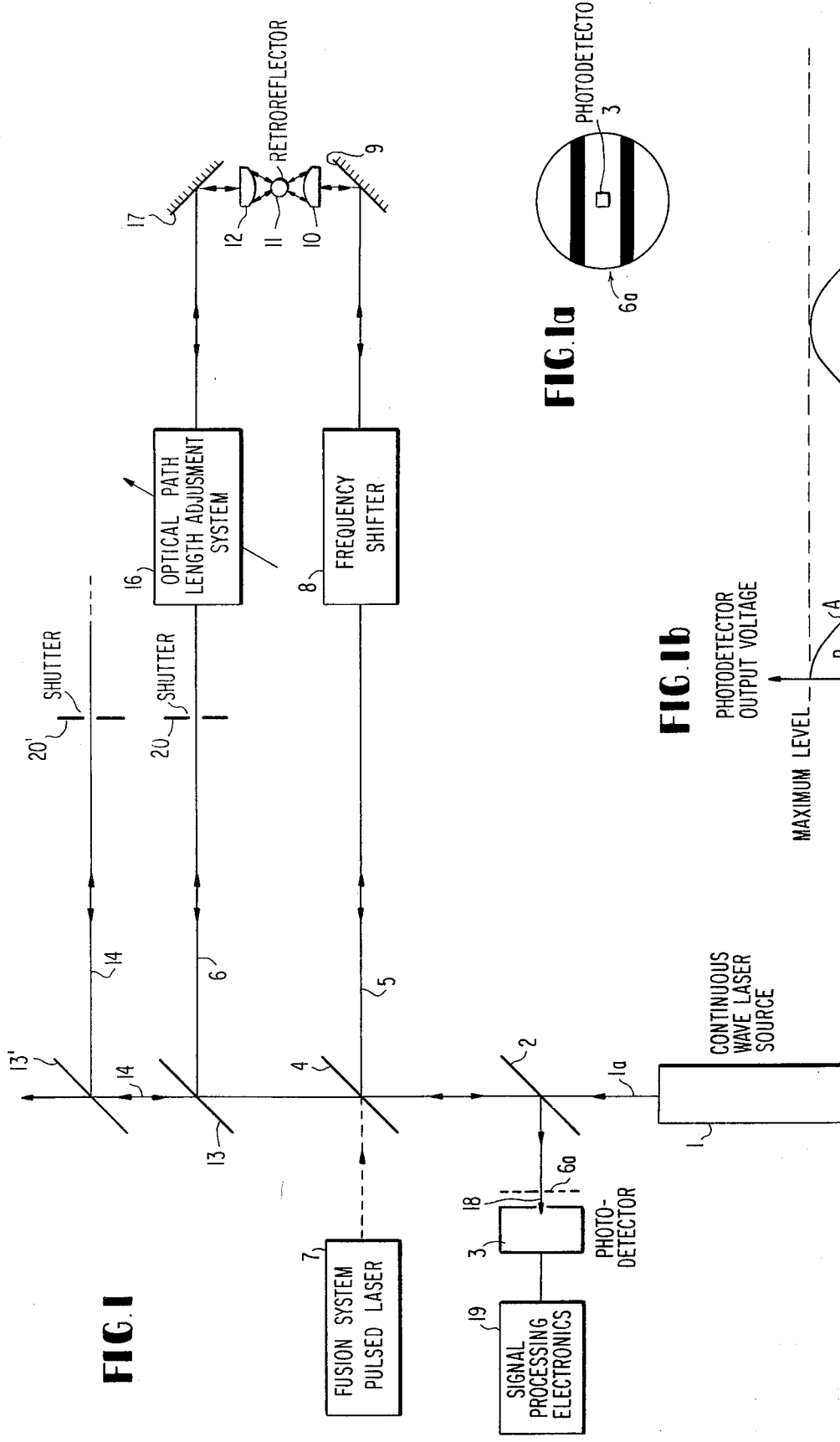

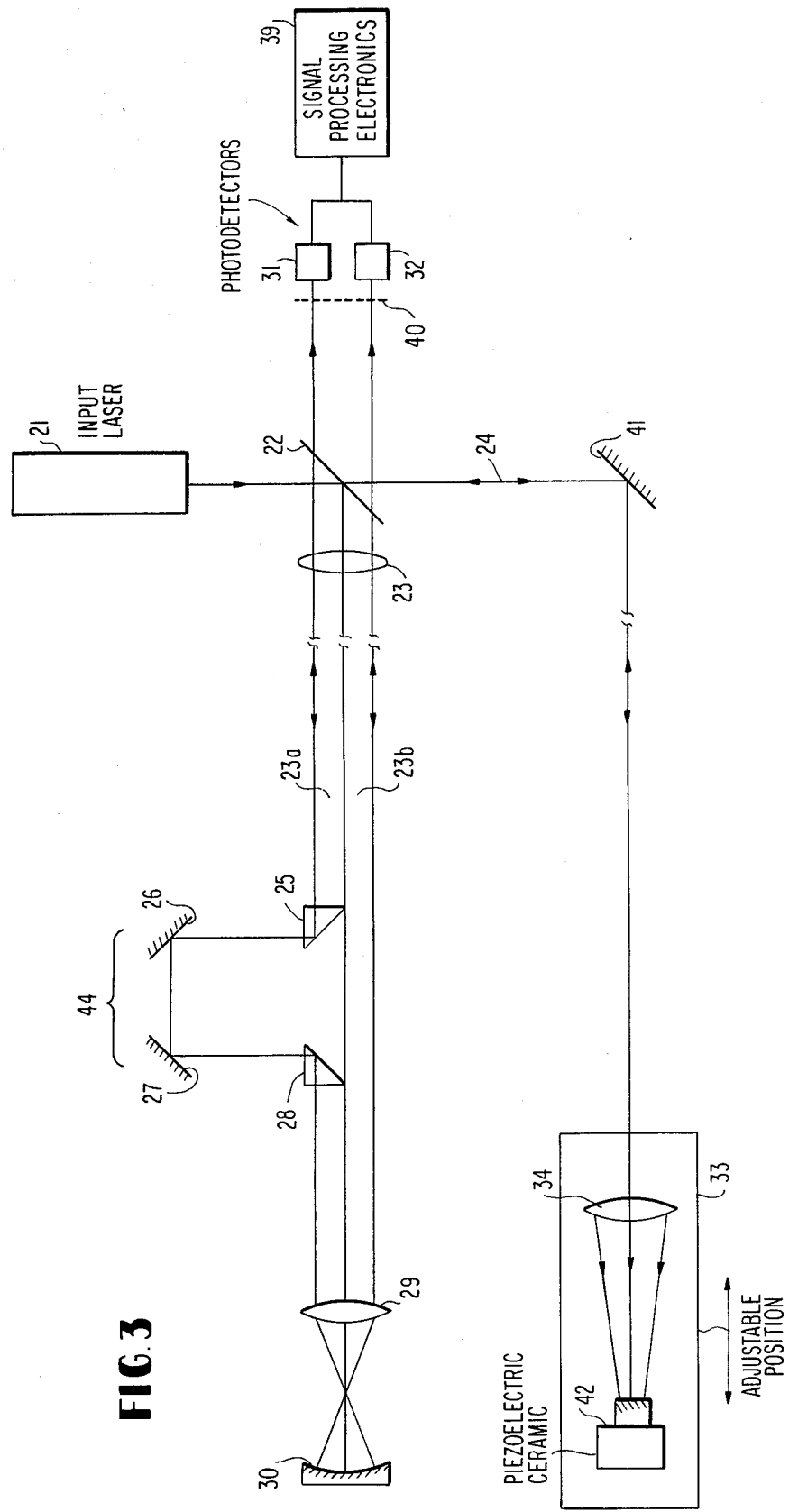

METHOD AND APPARATUS FOR TIMING OF LASER BEAMS IN A MULTIPLE LASER BEAM FUSION SYSTEM

STATEMENT OF GOVERNMENT INTEREST

The invention described herein was made under contract with the United States Government as represented by the Department of Energy.

BACKGROUND OF THE INVENTION

1. Field of the Invention

In general, the invention relates to the field of fusion research and to the use of a plurality of laser beams travelling over different paths to impinge upon a fusion fuel pellet from different directions to initiate a fusion reaction by compressing the pellet. More particularly, the invention relates to a method and apparatus for the synchronization or timing of multiple laser beams by detecting differences in the optical path lengths of the beams and adjusting the optical path lengths to make them equal. Even more specifically, the invention relates to an optical heterodyne interferometric detection technique and apparatus for detecting differences in the optical path lengths between a master beam and a comparison beam derived from a common source beam, so that the comparison beam can be adjusted to have an optical path length substantially equal to that of the master beam whereby the beams arrive at a common target at the same time.

2. Description of the Prior Art

Optical heterodyne interferometry per se is known in the prior art; for example, this type of interferometry is described in an article by Jean-Louis Meyzonnette and N. Balasubramanian in *Optical Engineering*, Vol. 13, No. 5, pp. 455–459 (September–October 1974). In addition, optical heterodyne interferometric detection techniques have been used for determining phase differences of two laser beams (U.S. Pat. No. 4,030,831), measuring the doppler frequency shift of one laser beam relative to a reference laser beam (U.S. Pat. No. 3,950,100), and improving the signal-to-noise ratio in optical communication systems (U.S. Pat. No. 3,175,088). However, the prior art does not teach an optical heterodyne interferometric detection method or apparatus for the detection and adjustment of differences in the optical path lengths of two beams of electromagnetic radiation, such as two laser beams. Furthermore, the prior art does not teach an optical heterodyne interferometric detection method or apparatus for synchronizing a plurality of laser beams by adjusting the optical path lengths of each of the beams to equal the optical path length of a master laser beam.

Prior to this invention, timing of laser beams in fusion laser systems was accomplished by a device, such as a streak camera, to detect differences in optical path lengths between laser beams. For example, high speed electro-optical streaking cameras, such as the Hadland Imacon 675A, have been used to time beams in fusion laser systems. In operation the laser system is fired, and pulses from each beam are recorded on the streak camera in order to determine differences in the time-of-flight for an optical pulse in each of the beams. This technique is limited in precision by the resolution (10–15 picoseconds) of available streak cameras and the shortest pulses available from the laser system (generally in the 30–50 picosecond range). Another disadvantage of this technique is that a portion of the laser system must be fired in order to time the beams, and this is costly since it ages the system, and it is time-consuming since only one beam is timed per firing.

SUMMARY OF THE INVENTION

The present invention overcomes the disadvantages of the prior art by providing a novel method and apparatus for synchronizing a plurality of comparison laser beams by adjusting the optical path lengths of the comparison laser beams to equal the optical path length of a master laser beam. An optical heterodyne interferometric detection technique is used to determine the difference in optical path lengths between the master beam and each of the comparison laser beams and to indicate when the optical paths of the comparison beams are equal to that of the master beam. This detection technique allows precise timing of the comparison laser beams, is very reliable and is easy to implement.

Therefore, the primary object of the invention is to provide a method and apparatus for detecting differences in path lengths between two optical beams, such as two laser beams, by using an optical heterodyne interferometric detection technique.

Another object of the invention is to provide a method and apparatus for timing a plurality of beams of electromagnetic radiation such as a plurality of laser beams, by comparing the optical path length of each beam to that of a master beam by using an optical heterodyne interferometric detection technique, and then adjusting the optical path of each comparison beam to be equivalent to the optical path length of the master beam so that all the beams arrive at a common target at substantially the same time.

Still another object of the invention is to provide a method and apparatus for synchronizing a comparison beam and a master beam of partially coherent electromagnetic radiation, where the synchronization is accomplished by adjusting the optical path length of the comparison beam in response to a time-varying (heterodyne) interference pattern generated by the combination of the comparison beam and the frequency-shifted master beam, the interference pattern being indicative of the difference in optical path lengths of the beams.

Yet another object of the invention is to provide a method and apparatus for synchronizing two laser beams of finite bandwidth, derived from the same laser source, by frequency-shifting one of the beams and adjusting the optical path length of the other beam in response to an optical heterodyne interference pattern, which pattern is created by the recombination of the frequency-shifted beam and the adjusted beam and which is indicative of the difference in optical path lengths of the beams.

A further object of the invention is to provide a method and apparatus for synchronization of a comparison laser beam and a master laser beam derived from a single laser source, where the synchronization is accomplished by using a chirped laser source (a laser source whose output is frequency-modulated), and adjusting the optical path length of the comparison laser beam in response to an optical heterodyne interference pattern being monitored by a photodetector whose output is an AC electrical signal indicative of the difference in optical path lengths of the laser beams.

Other objects and further advantages will become apparent by reference to the following detailed description and accompanying drawing.

BRIEF DESCRIPTION OF THE DRAWING

FIG. 1 is a block diagram of a laser beam timing system utilizing the heterodyne interferometric beam timing method.

FIG. 1a shows the interference pattern 6a at an instant in time at the photodetector 3 of the laser beam timing system shown in FIG. 1.

FIG. 1b is a graph showing representative output electrical signals from the photodetector 3 of the laser beam timing system shown in FIG. 1 for three representative optical path length differences between the comparison and master laser beams utilized in the timing system.

FIG. 2 shows a chirped laser source which can be used with the system shown in FIG. 1 to provide an alternative method of laser beam synchronization.

FIG. 3 shows another embodiment of the optical heterodyne beam timing method.

DESCRIPTION OF THE PREFERRED EMBODIMENTS

The initiation of a fusion reaction by using a plurality of laser beams to compress a fuel pellet is facilitated by synchronizing or timing the laser beams so that the beams arrive at the target (pellet) at precisely the same time. Synchronization of the beams insures that the maximum compressional force on the target is achieved and that the compressional force is uniformly applied. The Omega-Ten laser fusion system now being developed at the University of Rochester uses a single laser energy source which is split into twenty-four separate laser beams which are individually directed through amplifiers and optical systems eventually to impinge from different directions on a target in the form of a suspended fusion fuel pellet. The disclosed invention relates to a method and apparatus for sequentially adjusting the optical path lengths of the twenty-four laser beams by comparison with a master laser beam so that each of the twenty-four comparison laser beams will travel equivalent optical paths. The comparison is made by using an interferometric pattern to detect path length differences. By adjusting the optical path lengths of the twenty-four comparison laser beams to make them equivalent to the optical path length of the master laser beam, the comparison laser beams are timed or synchronized to impinge on the target within $\pm 1 \times 10^{-12}$ second of each other.

Before referring to the drawing, it should be noted that the reference to laser beams as used herein refers to any partially coherent electromagnetic radiation capable of producing an interference pattern which can be detected by an appropriate photodetector. Thus, although the following description refers to a method for timing laser beams by optical path length adjustment, the method can be used to adjust the optical path length of any partially coherent electromagnetic radiation, such as ultraviolet, infrared, microwave, etc. Furthermore, it should be pointed out that the functions of the system components may be performed by many alternative components capable of performing the same functions, and no attempt has been made to list all possibly equivalent components.

FIG. 1 is a block diagram of a laser beam timing apparatus utilizing the optical heterodyne interferometric detection technique for timing a plurality of laser beams derived from a common source laser beam by conventional beam splitters. The apparatus includes a continuous wave calibrating or input laser source 1 of finite bandwidth, a frequency shifter 8, an optical path length adjustment system (PLAS) 16, a photodetector 3, signal processing electronics 19, beam splitters 2, 4 and 13, an open shutter 20, mirrors 9 and 17, focusing lenses 10 and 12, and a spherical retroreflector 11.

The laser beam timing method or technique includes splitting the output from laser source 1 into a first comparison laser beam 6 and a master laser beam 5, frequency-shifting the master laser beam 5, reflecting the laser beams from retroreflector 11, recombining the laser beams at beamsplitter 4, detecting the interference pattern 6a generated by the recombined laser beams by monitoring with photodetector 3 the optical heterodyne component of the laser beam interference pattern as a measure of the differences in optical path lengths between the first comparison laser beam 6 and the master laser beam 5. The first comparison laser beam 6 is then adjusted in optical path length by optical path length adjustment system 16 until the detected AC heterodyne photocurrent indicates that the optical path lengths of the first comparison beam and the master laser beam are equal. In this manner, the first comparison laser beam 6 is synchronized or timed to arrive at retroreflector 11 at the same time as the master laser beam 5. By closing shutter 20 and opening a corresponding shutter 20' for the next comparison laser beam 14, the process can be repeated with the second comparison laser beam. This process is continued until all of the comparison laser beams have been synchronized with the master laser beam, and thus all the comparison laser beams are timed to arrive at the retroreflector 11 at the same time.

The laser source 1 can be a 1.06 micron YAG laser consisting of a cw optically pumped YAG laser capable of emitting several hundred milliwatts of power in a single frequency $TEM_{00}$ mode. A suitable laser is the model manufactured by the Control Laser Corporation. Alternative laser sources can be used. For example, the Eastman Kodak Company, Kodak Apparatus Division, has performed tests for the Laboratory for Laser Energetics of the University of Rochester to evaluate the heterodyne interferometric beam timing system by using the 568.4 nm line from a Coherent Radiation, Inc. model 50 Krypton+++ ion laser. Of course, other laser sources having similar operating characteristics could be used.

Photodetector 3 is any photovoltaic or photoconductive device which is sensitive to the frequency of the laser source 1 and which produces electrical signals corresponding to the optical signals incident upon it. For example, a suitable device for the photodetector 3 is a square law detector consisting of a silicon photodiode similar to one available from United Detector Technologies. The detector is operated in the photovoltaic mode into the inverting input of an operational amplifier operating in the current-to-voltage transconductance mode.

The frequency shifter 8 can be any one of several devices including moving mirrors, an acoustically vibrated optic, rotating optical wave plate, etc. For example, the frequency shifter 8 may consist of a set of moving mirrors which effectively doppler shift the reflected beam. In the experimental embodiment of the invention, a PLAS (path length adjustment system) in the master beam line is continuously translated to effect the required frequency shift. Any other method of shifting the optical frequency of the master beam with respect to the comparison beam may also be utilized.

The optical path length adjustment system (PLAS) 16 may be a glass block, a cube arrangement of mirrors and prisms, a three corner cube, etc. For example, the PLAS may consist of three plane mirrors arranged in the configuration of a cube corner. This assembly of mirrors is mounted on a mechanical translation stage. A beam entering the mirror array is reflected back parallel to its original path, with a fixed displacement from the original beam axis. Translation of the mirror assembly along the beam axis results in an increase or decrease of the optical path length of the beam without altering the direction of the reflected beam.

The signal processing electronics 19 may consist of any means for detecting the modulation of the electrical signal generated by the photodetector 3. For example, if audio frequency components are employed, operational amplifier circuits may be utilized to amplify, filter and rectify the heterodyne signal. The final DC signal representing the modulation may be displayed on a meter, oscilloscope or chart recorder or digitized for processing by computer.

The beam splitters 2, 4 and 13 and mirrors 9 and 17 are produced using conventional optical fabrication techniques. In high power laser applications the optical coatings must be composed of only low absorption dielectric materials. In systems for low power applications either metallic or dielectric coatings may be employed on the mirrors and beam splitters.

The lenses 10 and 12 are produced using conventional optical fabrication techniques, as adapted to high power laser systems.

Retroreflector 11 may consist of either a polished metal sphere or optical quality glass sphere coated with a high reflectance metal or dielectric coating. The retroreflector is supported at the focal point of the focusing lenses by a stalk which may be formed of either metal or glass.

In operation, as shown in FIG. 1, the timing system input beam 1a from the calibrating laser source 1 is directed to the timing system beam splitter 2 and then to the primary beam splitter 4. The output of laser source 1 has a finite bandwidth $\Delta\lambda$ (i.e. a partially inherent output) which can be adjusted to alter the sensitivity of the laser beam timing system. The frequency bandwidth of the calibrating laser source 1 can be adjusted by translating a cavity mirror within the laser source 1 through a small range.

The primary beam splitter 4 splits the input beam into a master beam 5 and a comparison beam 6. When the system is operating to initiate a laser fusion reaction, a pulsed power laser 7 is directed at the beam splitter 4. However, the laser 7 is inoperative during the beam timing operation of this invention, and the calibrating laser source 1 supplies all of the energy necessary to accomplish the timing function.

The master beam 5 travels through frequency shifter 8 which shifts the frequency of the master beam. The frequency shift created by the frequency shifter 8 is small compared to the bandwidth of the laser beam source 1. Thus, if the cavity mirror in laser source 1 is oscillated at a frequency which is large compared to the frequency of the heterodyne photocurrent, then the laser has an effective coherence length or a degree of partial coherence which is determined by the amount of translation of the cavity mirror. The effective coherence length of the YAG laser is given by: $\tau = \lambda^2/\Delta\lambda$ where $\lambda$ is the mean wavelength of the source, and $\Delta\lambda$ is the bandwidth of the shift introduced by moving the cavity mirror. A typical value of $\tau$ for a YAG laser is 1 cm. ($\lambda$ equals approximately 1 micron and $\Delta\lambda$ equals 1 angstrom). This represents a lower limit on the coherence length obtainable through this method. The path lengths of the beams can be equalized to at least one tenth of this value, corresponding to approximately three picoseconds timing error. The signal-to-noise ratio which is obtainable with heterodyne detection allows more precise timing to be achieved. The ability effectively to control the coherence length of the laser source 1 gives the optical heterodyne interferometric beam timing system a variable path length sensitivity.

After being frequency-shifted, the master beam 5 impinges upon mirror 9 and is directed through focusing lens 10 and then to the surrogate target, retroreflector 11, from which it is reflected to retrace its path back to timing system beam splitter 2 and onto photodetector 3.

The comparison beam 6 travels from primary beam splitter 4 to an initial beam splitter 13 where it is again split to form a second comparison beam 14. The first comparison beam 6 travels through open shutter 20 and the optical path length adjustment system 16 which is capable of changing the optical path length of the comparison beam by an amount on the order of the coherence length of the laser beam source 1. After passing through the optical path length adjustment system 16, the first comparison beam 6 is directed by mirror 17 to focusing lens 12 and then to retroreflector 11. The beam 6 is then reflected back along its path to primary beam splitter 4 where it is recombined with the master beam 5 to form interference pattern 6a which is detected by photodetector 3.

Photodetector 3 responds to the intensity of the timing system output beam 18; i.e. the interference pattern 6a generated by the recombination of the master beam 5 and the comparison beam 6. As shown in FIG. 1a, the interference pattern 6a consists of a series of alternating light and dark fringes. The sensitive area of the photodetector 3 is designed to have a width smaller than the width of the fringes of the interference pattern 6a. The fringes will pass over the sensitive area of the photodetector 3 at the difference frequency between the master beam 5 and the comparison beam 6; i.e. the intensity of the light seen by the photodetector varies as the beat frequency.

As shown in FIG. 1b, the photodetector 3 provides an alternating current output at the difference frequency. This AC output has an amplitude which achieves a maximum value when the optical path lengths of the comparison beam 6 and the master beam 5 are equal as shown by curve A. FIG. 1b also depicts the effect on the AC output as the optical path length of the comparison beam 6 is varied with respect to the optical path length of the master beam 5. Curves B and C show the AC waveforms for progressively greater differences in optical path lengths. Even though the frequency of the AC signal remains the same, the amplitude decreases as the optical path length difference between the master beam 5 and the comparison beam 6 increases.

If the master beam 5 and the comparison beam 6 were of the same frequency, the fringe pattern as shown in FIG. 1a would be stationary, and the electrical output from the photodetector would be a constant DC signal. The level of this DC signal would be responsive to differences in the optical path lengths of the master beam 5 and the comparison beam 6 with the maximum level being obtained when the optical path lengths of the two beams were equal.

Furthermore, if the frequency of the master beam 5 is continuously changing, the interference pattern 6a will move across the photodetector 3 at varying frequencies, thereby producing a frequency-modulated alternating current signal output from the photodetector 3. However, the amplitude of the alternating current signal will remain at the maximum level as long as the optical path lengths of the master beam 5 and the comparison beam 6 are equal. When the comparison beam 6 is adjusted in optical path length, the amplitude of the frequency-modulated signal will vary as shown in FIG. 1b.

The electrical output of photodetector 3 is monitored by signal processing electronics 19 while an operator adjusts the optical path length of the comparison beam 6 with the optical path length adjustment system 16. In the preferred mode of operation, the signal processing electronics 19 simply monitors the amplitude of the electrical output from the photodetector 3 to determine when the AC amplitude is at a maximum. This maximum corresponds to equal optical path lengths of the master beam 5 and the comparison beam 6. The signal processing electronics 19 monitors the DC electrical output from the photodetector 3 if the system is used without frequency shifting the reference beam 5.

It should be emphasized that the generation of a time-varying heterodyne interference pattern is not essential to perform the laser beam timing function. For example, if the frequency shifter 8 is omitted from the timing system depicted in FIG. 1, then an inteference pattern will still be produced at the photodetector 3. If the optical path lengths of the first comparison beam 6 and the master beam 5 are not equal, then the visibility of the fringes produced will fall below a maximum value which corresponds to equal optical path lengths of the beams.

The second comparison beam 14 is compared to the master beam 5 in exactly the same manner as the first comparison beam 6. When the beam 6 has been timed, the shutter 20 is closed and shutter 20' is opened to permit the second comparison beam 14, reflected from beam splitter 13', to be timed in the same manner. This process is continued until all of the comparison beams have been timed or synchronized with the master beam 5. Thus, all of the comparison beams are timed to arrive at the surrogate target, retroreflector 11, at substantially the same time, i.e. with a difference in arrival times on the order of $\pm 1 \times 10^{-12}$ second.

FIG. 2 shows a chirped laser source which can be used to eliminate the need for frequency shifter 8 shown in FIG. 1. The use of the chirped laser source results in a somewhat different method of operation of the invention. As shown in FIG. 2, the chirped source consists of a laser medium 38 disposed between two mirrors 35 and 36 with a tilting etalon 37 located in the laser cavity. By simultaneously translating one of the laser cavity mirrors along the axis of the cavity and tilting the etalon 37 in the laser cavity, the laser source is "chirped". The rotation of the etalon 37 and the translation of the mirror must be coordinated to insure that the single frequency selected by the etalon 37 is scanned linearly in time. The chirped laser source can be implemented by linearly scanning a single TEM$_{00}$ mode across the gain profile of a cw YAG laser. When the chirped laser source is used in the timing system described above and illustrated in FIG. 1, there is no need to have the frequency shifter 8 for shifting the frequency of the master beam 5.

In operation, the energy from the chirped source is split into a comparison beam 6 and a master beam 5 exactly as shown in FIG. 1. The comparison beam 6 is processed as previously described and as shown by FIG. 1. However, the master beam 5 is not shifted in frequency, but is simply used as a reference beam. Thus, the timing system output beam 18 consists of a reference master beam 5 and the comparison beam 6. An optical heterodyne interference pattern is still produced at the photodetection system 3 if the comparison beam and the reference master beam have different optical path lengths since the laser source is continuously being scanned in frequency, and, therefore, the recombined beam is a combination of beams of slightly differing frequency. When the optical path lengths of the comparison beam 6 and the reference master beam 5 are equivalent, the AC heterodyne photocurrent is nonexistent since the recombined beams are of the same frequency. Thus, a null in the amplitude in the AC heterodyne photocurrent corresponds to equal path lengths of the comparison beam and the reference master beam.

It should be pointed out that the tilting etalon 37 is not equivalent to the moving cavity mirror described in conjunction with laser source 1 in FIG. 1. The tilting etalon causes the frequency output of the laser to be continuously scanned. Thus, the laser source of FIG. 2 is modulated in frequency. By contrast, the moving cavity mirror of laser source 1 in FIG. 1 is used to generate a bandwidth for the source and not to frequency-modulate the source.

FIG. 3 shows an alternative embodiment of an optical heterodyne interferometric laser beam timing system wherein the comparison and master beams do not impinge upon a common target. Also, this embodiment utilizes a null point electronic signal processing technique to monitor the optical heterodyne interference pattern produced by the recombination of the comparison and master beams.

In operation, a laser beam from an input laser 21 impinges upon a beam splitter 22 and is split into a comparison beam 23 and a master beam 24. The comparison beam 23 is divided into two laser beam channels 23a and 23b by an optical path delay system 44 consisting of prisms 25 and 28 and mirrors 26 and 27. The optical path delay system 44 operates by deflecting the laser beam channel 23a through an extended physical path relative to channel 23b. This physical path can be adjusted by changing the distance between the mirrors 26 and 27 and the prisms 25 and 28 to vary the path length of the channel 23a. (This type of optical path delay system could also be used as the optical path length adjustment system 16 shown in FIG. 1.) As used in the embodiment shown in FIG. 3, the optical path delay system 44 is designed to introduce a known, fixed optical path delay in channel 23a.

Channel 23b of the comparison laser beam 23 travels directly to lens 29 which focuses all of the beam 23 onto a mirror 30. Mirror 30 reflects both channels 23a and 23b back through beam splitter 22 to photodetectors 31 and 32, respectively, which may be silicon photodiodes.

The master beam 24 passes through beam splitter 22 to mirror 41 and is directed to an adjustable piezoelectric translator 33 which includes a lens 34 for focusing the master beam 24 onto a suitably electrically driven piezoelectric ceramic 42. The piezoelectric ceramic 42 shifts the master beam 24 in frequency and reflects the energy back to mirror 41 and to beam splitter 22 which directs the energy to photodetectors 31 and 32.

The recombined comparison beam 23 and master beam 24 produce an optical heterodyne interference pattern 40. Photodetector 31 is positioned to respond to only that portion of the interference pattern which is formed by the combination of the master beam 24 with channel 23a of the comparison beam 23, while photodetector 32 is positioned to respond to only that portion of the interference pattern formed by the combination of the master beam 24 with channel 23b. The electrical output signals from photodetectors 31 and 32 are compared by subtracting one signal from the other and indicating the magnitude of this difference. This comparison is carried out by signal processing electronics 39.

The magnitude of the electrical output signal from a given photodetector is a maximum when that photodetector is detecting an interference pattern portion formed by recombined beams of equal optical path lengths. For example, the magnitude of the electrical signal outputted by photodetector 31 will be a maximum when the master beam 24 and the channel 23a of the comparison beam 23 are equal in optical path length. Similarly, the output from photodetector 32 will achieve a maximum when the optical path lengths of the master beam 24 equals the optical path length of the channel 23b of the comparison beam 23. The outputs of the electrical signals from the photodetectors 31 and 32 are subtracted in order to utilize signal processing electronics 39 producing a null when the master beam 24 has an optical path length which differs slightly from the optical path length of channel 23a and the optical path length of channel 23b. However, this slight optical path length difference is known since the optical path delay of channel 23a with respect to channel 23b is a known fixed quantity. Therefore, once the null signal has been detected by the signal processing electronics 39 in response to the movement of piezoelectric translator 33, the position of translator 33 can be further adjusted so that the optical path length of the master beam 24 is equal to either the optical path length of channel 23a or channel 23b of the comparison beam 23.

Other embodiments and modifications of the invention will readily come to mind of one who is skilled in the art and has the benefit of the teachings presented in the foregoing description and drawing. Therefore, it is to be understood that the scope of this invention is not to be limited to the embodiments described herein and that modifications and alternative embodiments are intended to be included within the scope of the appended claims.

We claim:

1. In a multiple beam laser fusion system wherein the fusion laser beams are derived from a single pulsed laser and are directed to impinge from different directions on a fusion fuel pellet to initiate a fusion reaction, the method of adjusting the timing of the laser beams so that they all will arrive at the fuel pellet at substantially the same time comprising the steps of:
    substituting a retroreflector for the fusion fuel pellet;
    substituting for the pulsed laser a partially coherent continuous wave laser producing an output laser beam having a finite bandwidth;
    splitting the output laser beam from the continuous wave laser into at least a master beam and a first comparison beam and directing the split beams over the same two optical paths traveled by two of the fusion beams;
    shifting the master beam in frequency;
    reflecting the master beam and the comparison beam from the retroreflector;
    recombining the reflected beams to form an optical heterodyne interference pattern whose fringe visibility is indicative of the different lengths of said two optical paths; and
    adjusting the optical path length of the comparison beam until said fringe visibility indicates that said two optical path lengths are equal and, thus, that the comparison and master laser beams are arriving at the retroreflector at the same time.

2. A method as recited in claim 1 further comprising the steps of:
    converting the light intensity from said interference pattern to a corresponding AC electrical signal; and
    adjusting the optical path length of said comparison beam until the amplitude of said AC signal is a maximum.

3. A method for timing a comparison beam and a master beam of partially coherent electromagnetic radiation of the same frequency and finite bandwidth comprising:
    shifting the frequency of the master beam relative to that of the comparison beam;
    combining the two beams to produce an optical heterodyne interference pattern which is indicative of the difference in optical path lengths of the beams;
    detecting the interference pattern of the combined beams; and
    adjusting the optical path length of the comparison beam until the interference pattern indicates that the difference in optical path lengths of the beams is zero.

4. A method as recited in claim 3 wherein said frequency shifting step comprises introducing a frequency shift in the master beam prior to combining the beams so that the frequency of the comparison beam differs from the frequency of the master beam when the beams are combined.

5. A method as recited in claim 4 further comprising producing the comparison beam and the master beam from a single laser source.

6. A method as in claim 3 wherein said frequency shifting step comprises producing the comparison beam and the master beam from a single chirped laser source.

7. An apparatus for timing a comparison laser beam and a master laser beam of finite bandwidth and of the same frequency and comprising:
    means for shifting the frequency of the master beam relative to that of the comparison beam;
    means for combining the two laser beams to produce an optical heterodyne interference pattern indicative of the difference in optical path lengths of the laser beams;
    means for detecting the interference pattern; and
    means for adjusting the optical path length of the comparison laser beam until the interference pattern indicates that the difference in optical path lengths is zero.

8. An apparatus for timing a comparison laser beam and a master laser beam of the same frequency as recited in claim 7 wherein said frequency shifting means comprises means for generating the comparison and master laser beams from a single chirped laser beam source.

9. An apparatus for timing a comparison laser beam and a master laser beam of the same frequency as recited in claim 7 wherein said frequency shifting means comprises means for introducing a frequency shift in the master laser beam prior to combining the beams, so that the two beams are of different frequencies when they are combined, whereby said means for combining the beams produces an optical heterodyne interference pattern whose fringe visibility is indicative of the difference in the optical path lengths of the beams.

10. An apparatus for timing a comparison laser beam and a master laser beam of the same frequency as recited in claim 9 further comprising means for generating the comparison laser beam and the master laser beam from a single laser beam source.

* * * * *